United States Patent [19]
Kaneko et al.

[11] Patent Number: 5,377,341
[45] Date of Patent: Dec. 27, 1994

[54] BUFFER STORAGE CONTROL SYSTEM

[75] Inventors: Seiji Kaneko, Yokohama; Toshiyuki Kinoshita, Sagamihara; Akio Yamamoto, Sagamihara; Yasuhisa Tamura, Sagamihara, all of Japan

[73] Assignee: Hitachi, Ltd., Tokyo, Japan

[21] Appl. No.: 710,336

[22] Filed: Jun. 5, 1991

[30] Foreign Application Priority Data

Jun. 5, 1990 [JP] Japan ................................. 2-147774

[51] Int. Cl.⁵ .............................................. G06F 12/02
[52] U.S. Cl. ........................... 395/425; 364/DIG. 1; 364/228.1; 364/228.3; 364/243.4; 364/251.4; 364/254.2
[58] Field of Search ................. 395/400, 425; 364/200 MS File, 900 MS File

[56] References Cited

U.S. PATENT DOCUMENTS

| | | | |
|---|---|---|---|
| 4,598,362 | 7/1986 | Kinjo et al. | 395/250 |
| 4,755,938 | 7/1988 | Takahashi et al. | 395/725 |
| 5,050,066 | 9/1991 | Myers et al. | 395/575 |

FOREIGN PATENT DOCUMENTS

61-45355 3/1986 Japan.

OTHER PUBLICATIONS

"M-68x Processor Group Functional Manual", 6080-2-002, Hitachi.
"370/XA Principles of Operation", SA. 22-7085, 5-24-~5-30, IBM.

*Primary Examiner*—Joseph L. Dixon
*Assistant Examiner*—Hiep T. Nguyen
*Attorney, Agent, or Firm*—Antonelli, Terry, Stout & Kraus

[57] ABSTRACT

In buffer storage equipment, storage control is carried out by a pipeline having two stages including a stage for executing out-of-order processing for processing a succeeding request with priority and a stage for not executing out-of-order processing. By this storage control, a request processing order is guaranteed at the stage for not executing out-of-order processing and a request is caused to wait at the stage for executing out-of-order processing.

12 Claims, 15 Drawing Sheets

DIAGRAM SHOWING ADDRESS INTERLEAVE OF DATA ARRAY (FULL STORE PROCESSING)

BUFFER STORAGE CONTROL SYSTEM

BACKGROUND OF THE INVENTION

The present invention relates to a control system for buffer storage equipment to be shared by a plurality of processing units.

A method for configuring a system which has a large capacity buffer storage shared by a plurality of processing units and provided between a buffer storage unit within each processing unit and a main storage unit, aims at improvement in the access time to the main storage unit by the shared buffer storage. This technique is suitable for the case where there is a large difference between the access time to the main storage unit and the processing time of the processing unit. The M-68xH processing system manufactured by Hitachi, Ltd. is one of the examples of a computer system having such a configuration. The configuration of this processing system is described in the "M-68x Processor Group Functional Manual" 6080-2-002, Hitachi, Ltd. Each of the processing units has a buffer storage unit (hereinafter to be referred to as a BS) of the store-through type control for each processing unit and every pair of processing units have one shared work buffer storage (hereinafter to be referred to as a WS) of the store-in type.

In the above system, when data in the main storage unit is necessary for executing an instruction in a processing unit, the BS is accessed to determine whether the necessary data exists in the BS. If the necessary data is not buffered in the BS, a transfer request for this data is generated and sent to the WS by the processing unit. The data transfer from the WS to the BS is performed in fixed amount of data called a block. The WS detects whether a block corresponding to this request is buffered within the WS. If the block exists in the WS, the data is read out from the WS and is transferred to the BS of the requesting processing unit.

There is another technique for guaranteeing an order of main storage references in a multiprocessor configuration. In such a system having a plurality of processing units, the instruction execution time for each processing unit varies depending on the state of the buffer storage unit within the processing unit or the occurrence of an interruption. Therefore, it is generally difficult to synchronize executions of instructions among the plurality of processing units. As a result, it becomes necessary to guarantee the order of references to the main storage by each processing unit in order to secure consistency between the processing units in accessing of the main storage unit. For example, in the "370/XA Principles of Operation", SA22-7085, 5-24~5-30, IBM Co., Ltd., the following conditions are defined so as to meet the above requirement. That is, "A sequence of reference or updating a main storage equipment by a processing unit does not necessarily coincide with an instruction execution order in the processing unit. However, it should not be observed by the other processing unit connected to the same storage that the processing unit processes the accesses of the main storage with a different order of the instruction sequence". The term 'observation' in the above description means that another processor can read data in the main storage that couldn't exist in the main storage if that processing unit would process the accesses to the main storage according to the same order of the instruction sequence.

In the guarantee of the processing order as indicated in the above document, it is not necessary to process the requests from the processing units in order in the main storage unit or the WS so long as there is no inconsistency in the results of the instruction executions. However, referring and writing operations by the other processing units are separately processed. Therefore, in the case where a processing method has been employed in which the processing is carried out with an out-of order sequence, some additional restriction of processing is necessary so that it can be guaranteed that irrational data not corresponding to a request equipment is not read out from the main storage, in the case where an updating order has been kept for the other processing units. However, it is difficult to realize such processing as described above if considering the case of a failure, and a method has been conventionally employed in which processing is carried out while keeping the updating order. For example, in order to guarantee the order of the above description, when a preceding processing is being kept in a wait table for some reason generated in the buffer storage, it is so controlled that the request of the following processing of data in the buffer storage equipment wouldn't be carried out before the preceding processing. JP-A-61-45355 realizes this method as an example of the prior art. According to this prior art technique, a request selection system is shown in which a succeeding request is selected after a signal has been received which indicates that processing for a preceding request has been completed.

As another type of prior art technique, a technique for pipeline processing using a buffer storage is known. A response time is important for a buffer storage unit within the processing unit, whereas providing a high throughput of processing as well as the response time is important for design of the buffer storage. And, some implementations of buffer storage, applied pipeline processing method which are commonly used in constructing arithmetic processing unit, are known.

An example of the pipeline processing will be explained below. In the buffer storage shared by the processing units, the following three types of processing are sequentially carried out to process a request for reference to or updating of data in the buffer storage unit by the processing units.

(1) Arbitrate requests from the processing units and select one from among them. (This processing will be called a P stage hereinafter.)
(2) Refer to the buffer storage to test whether data meeting the request selected in the P stage is stored in the buffer storage. (This processing will be called a J stage hereinafter.)
(3) Pass the request that requires the data that is buffered in the buffer storage, the existence of which in the buffer storage has been tested in the J stage.
(4) The buffer storage equipment reads out the data from the buffer storage equipment or updates the data. (This processing will be called a W stage hereinafter.)

Assuming that the processing corresponding to each of the above stages can be executed in one cycle, a total of four cycles are necessary to process one request. In the pipeline processing method using a buffer storage unit, as described above, the time required for processing is not reduced by overlappingly executing the respective stages, but a new request is processed in each cycle, so that the total throughput is equivalently improved.

As another conventional method of improving throughput, a structure is known in which the number of requests that can be accepted at one time is increased by improving the parallel processing capability. This method can be used together with the pipeline method. When this method is applied to the above processing example, it is possible to select a plurality of requests at the P stage and to simultaneously process the plurality of requests during one cycle at each of the subsequent stages including the J stage. For example, in the buffer storage which employs the above-described pipeline processing method, when a plurality of cycles are required to read data from a memory because of the slow R/W operation of the memory, a plurality of memory sections are provided and the plurality of memory sections are simultaneously operated to attain the necessary performance. An example of a data flow in the pipeline processing for executing the above control is shown in FIG. 4. FIG. 4 shows a case where two cycles are required for the W stage and two processings can be executed in parallel at the W stage, which are indicated by $W_0$ and $W_1$ in the drawing.

In the buffer storage employing pipeline processing, which is explained in the above prior art example, the above-described processing order control in the buffer storage is achieved by keeping at each stage the order of requests selected at the P stage. An example of this control is shown in FIG. 5. For example, subsequent to a request 1 from a processing unit A for starting a buffer storage section $W_0$, assume that a request 2 from the processing unit A for simultaneously starting two buffer storage sections ($W_0$ and $W_1$) is generated at a cycle that the processing of the preceding request 1 has been completed. For the idle buffer storage section $W_1$, a request 3, which uses only the buffer storage section $W_1$, from the other processing unit B is processed with a priority so that the processing order can be guaranteed. Therefore, the request 2 from the processing unit A for using the two buffer storage sections as shown in FIG. 5, cannot be submitted until the preceding request 1 has been completed. On the other hand, the request 3 from the processing unit B, which has arrived later than the request 2, can be processed earlier than the preceding request 2 which uses the two buffer storage sections. When the request 3 is processed earlier, it is possible to reduce the idle time of the buffer storage, so that the buffer storage can be effectively used.

However, the system in which a request is issued to the buffer storage while predicting a busy state of the buffer storage, has a problem that a request from the processing unit for reading block data cannot be processed quickly. In general, such a read request from the processing unit to the shared buffer storage transfers the requested data as a fixed amount of data (hereinafter to be referred to as a block) of to the buffer storage unit (hereinafter to be referred to as a BS) within the processing unit. However, in this case, the data for processing the processing in the execution unit within the processing unit (hereinafter to be referred to as target data) is a part of the block data. In order to satisfy the data request from the execution unit to the BS, it is sufficient if it is possible to send only target data to the execution unit. The remaining data of the block is for expecting the effect of a prefetch. Therefore, sending the block data, the sending time of the target data becomes critical to the performance. Sending of the other portion of the block data may be slightly late. And, the block data is relatively larger than the store data. Therefore, when reading the block data, it is necessary to provide control such that a plurality of storage units within the buffer storage unit are activated simultaneously so that the time of reading the block data can be reduced. But as is described before, in the control method for predicting a busy state of the buffer storage unit, when a block transfer for a preceding request is to be started, the next request cannot be submitted until all of the buffer control sections to be used for the block transfer become free. Accordingly, there is less opportunity of submitting a request for using a plurality of buffer storage units at once, such as a request for a block transfer, than the opportunity of submitting a request for using only one buffer storage unit. As a result, it takes a long time before the request for processing in the buffer storage unit can be submitted, leading to decline in the performance of the system due to the increase in the response time.

SUMMARY OF THE INVENTION

It is an object of the present invention to provide buffer storage which guarantees an order of processings, improves the response time of the buffer storage to target data and has a relatively simple structure.

According to the present invention, in order to improve the response time of the buffer storage to the target data that has been a problem in the prior art technique, even if a part of the buffer storage is busy, another request is selected and the target data is sent in advance, if the part of the buffer storage which holds the target data is available. According to this method, even if a request for data other than the target data in the buffer storage has to wait, the processing for the target data can be carried out when the buffer storage is available for the target data. Thus, the data is sent and the response time of the buffer storage to the target data can be improved. However, when a block transfer request has been selected that conflicts with a preceding request, that blank transfer request must wait. Accordingly, to guarantee the order of the buffer storages, as explained in the prior art technique, the utilization efficiency of the buffer storage is lowered. To solve this problem, according to the present invention, an out-of-order processing of a succeeding request is employed while guaranteeing control of the order within the buffer storage, thereby to sustain the utilization efficiency of the buffer storage section. To be more specific, the step of the process pipeline in the buffer storage is divided into two steps: a first step which needs to guarantee the processing order of the whole system and a second step which guarantees only the order in each of the subsystems.

And applying the out-of-order processing method described before between processes of each subsystem, the present invention satisfies both, to guarantee the processing order and to improve the utilization efficiency of the subsystems.

Generally, processing in the buffer storage equipment, as described above, can be divided into two portions for providing the guarantee: a first portion that must be processed while keeping the requested order and a second portion in which the processing order may be changed so long as data consistency is maintained. As an example of the former case, there is a case where coherence control of the buffer storage equipment follows a write operation in the main storage unit. Actual writing and reading operations for the buffer storage are an example of the latter case. Accordingly, this system comprises a stage for keeping the processing order in the buffer storage pipeline and a stage for guaranteeing only the consistency of data. In other words, the processing which guarantees the order such as the coherence control of the buffer storage is executed in synchronism with a stage of the former, and the reading or writing processing for the buffer storage is executed in synchronism with the stage of the latter. Further, when the processing required to wait is in the stage of the former, the execution of the selection of the succeeding request is suppressed, and when the processing request is waiting in the stage of the latter, the selection of the succeeding request is executed so long as data consistency is maintained. In order to avoid competition among the preceding processing requests within the stage of the former, the selection of a processing request in the stage of the former is controlled. By the above control, it is possible to avoid such a situation that the buffer storage equipment is idle, so that a decline in the utilization efficiency of the buffer storage equipment can be prevented.

In the system having the above structure, the order of the buffer control can be guaranteed by keeping the execution order of the P stage. Further, by ensuring that out-of-order processing is possible at the E stage, it is possible to prevent a decline of the utilization efficiency of the buffer storage equipment. By causing the reading data portion other than the target data in the block data to wait at the E stage, it is possible to minimize the delay of the sending of the target data to the preceding request and to make the control relatively simple. The utilization efficiency of the buffer storage equipment is also lowered in the present invention, as has been the case in the prior art technique, when the request at the P stage is in a waiting state. However, it is possible to wait for the request at the E stage and most of the busy state relating to reference or updating results from the busy state of the buffer storage equipment. Therefore, it is relatively easy to control the buffer such that the waiting for the request at the P stage occurs infrequently.

DESCRIPTION OF THE PREFERRED EMBODIMENTS

Figure 2:
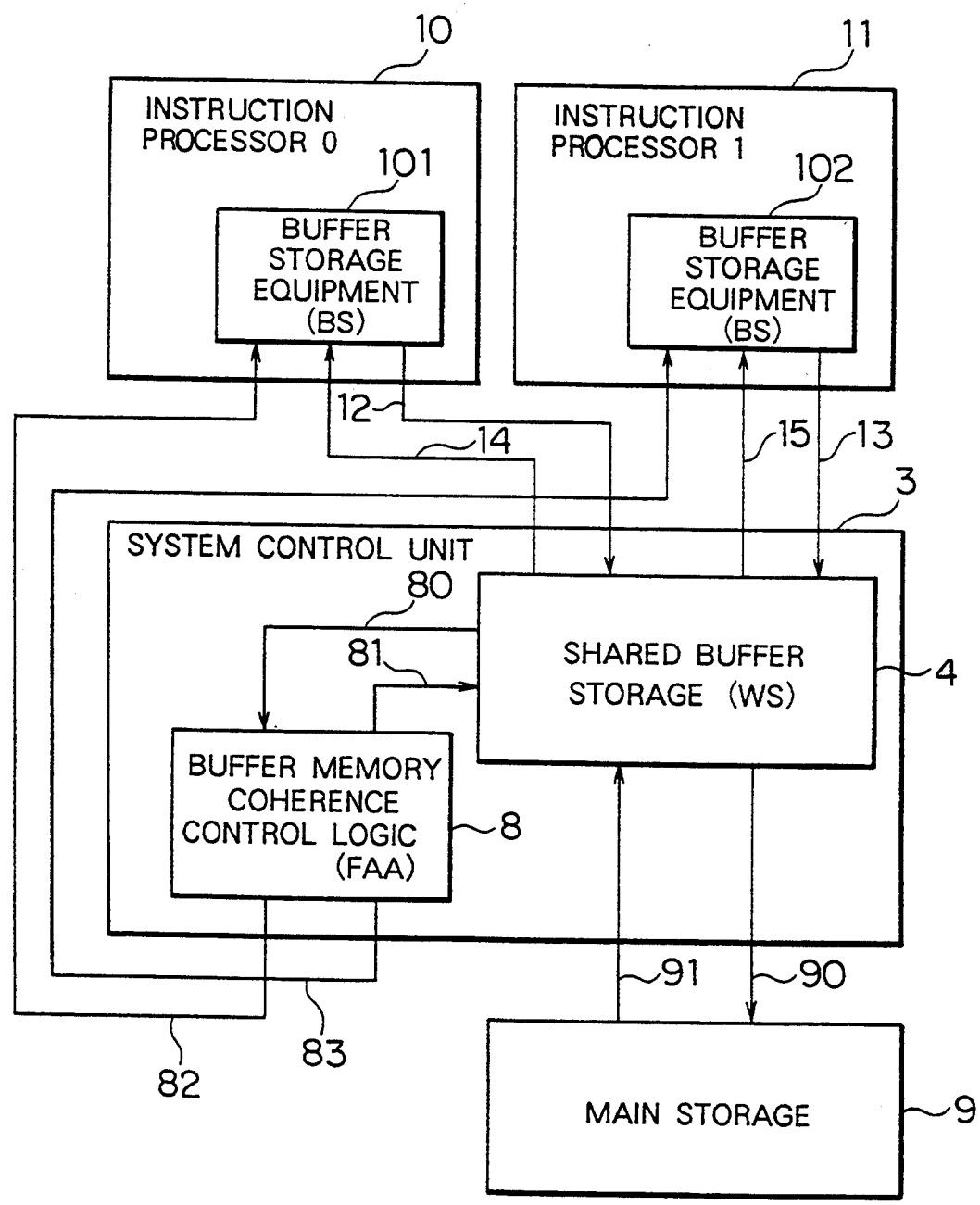
FIG. 2 is a block diagram showing a system configuration of the present invention.

A system configuration of the present embodiment is shown in FIG. 2. In this system, two instruction processors 10 and 11 are connected to a main storage unit 9 through a system control unit 3. The system control unit 3 manages the sequence of the system when the instruction processors 10 and 11 refer to the main storage unit 9. In this case, the instruction processors 10 and 11 have their own buffer storage units 101 and 102 (to be referred to as BSs hereinafter) of a small capacity store-through type inside these instruction processors, respectively. Instruction codes to be executed by the instruction processor 10 or 11 and operand data required for execution of an instruction are usually read from the BS 101 or 102. If the necessary operand data is not found in the BS, a data request based on the instruction is sent from the instruction processor to the system control unit 3. Since each of the BSs 101 and 102 employs a store-through system, when the instruction is a write instruction, write data subject to the execution of the write instruction is not only written in the BS but also a write request is sent to the system control unit 3 with the write data.

In order to reduce the number of requests to the main storage unit and to equivalently improve the access speed, the system control unit 3 has a shared work buffer storage unit 4 (to be referred to as a WS hereinafter) of the store-in type which unit is shared by the two instruction processors 10 and 11. When one of the two instruction processors 10 and 11 has generated a request for reading or writing data from or in the main storage unit, the processing corresponding to the request is carried out if it is possible to execute the processing by using the data buffered in the WS 4. If the data is not buffered in the WS 4, the system control unit 3 reads the data from the main storage unit 9, sends the requested data to the requesting source and registers the data in the WS 4.

The system control unit 3 also has a buffer storage coherence control logic 8 (hereinafter to be referred to as an FAA) for performing coherence control for the contents of the BS 101 or 102 in the processing units 10 and 11. This logic is for guaranteeing consistency of the contents of the BS 101 or 102 with those of the WS 4 when data is to be written in the main storage equipment, and operates in synchronism with the operation of the WS 4. The WS 4 sends an order of a request including an address supplied from the processing unit to that logic FAA through signal line 80, and receives a busy signal 81 which indicates that the logic is in process corresponding to the request.

Figure 1:
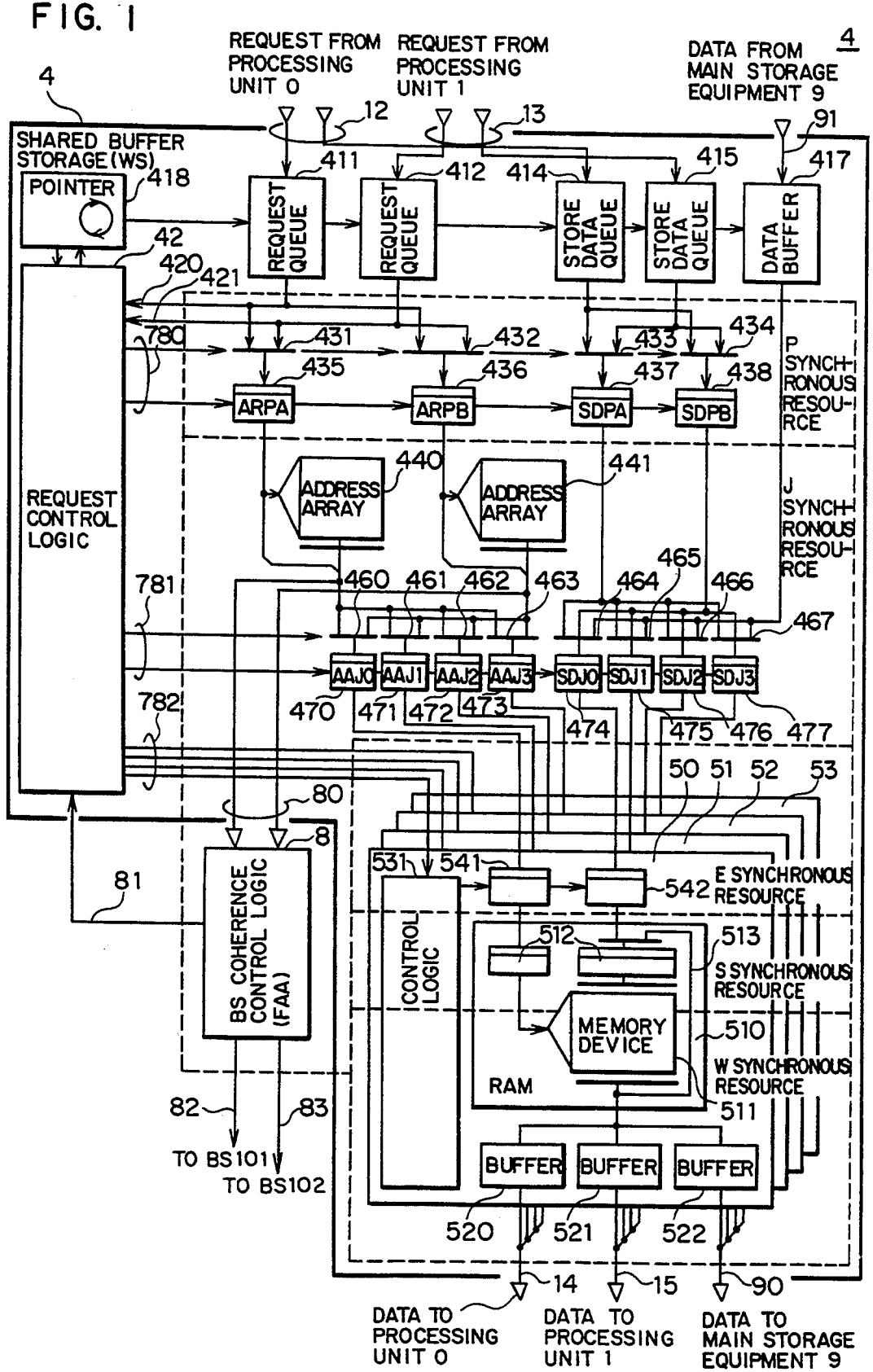
FIG. 1 is a block diagram showing the configuration of shared buffer storage equipment according to the present invention.
Figure 3:
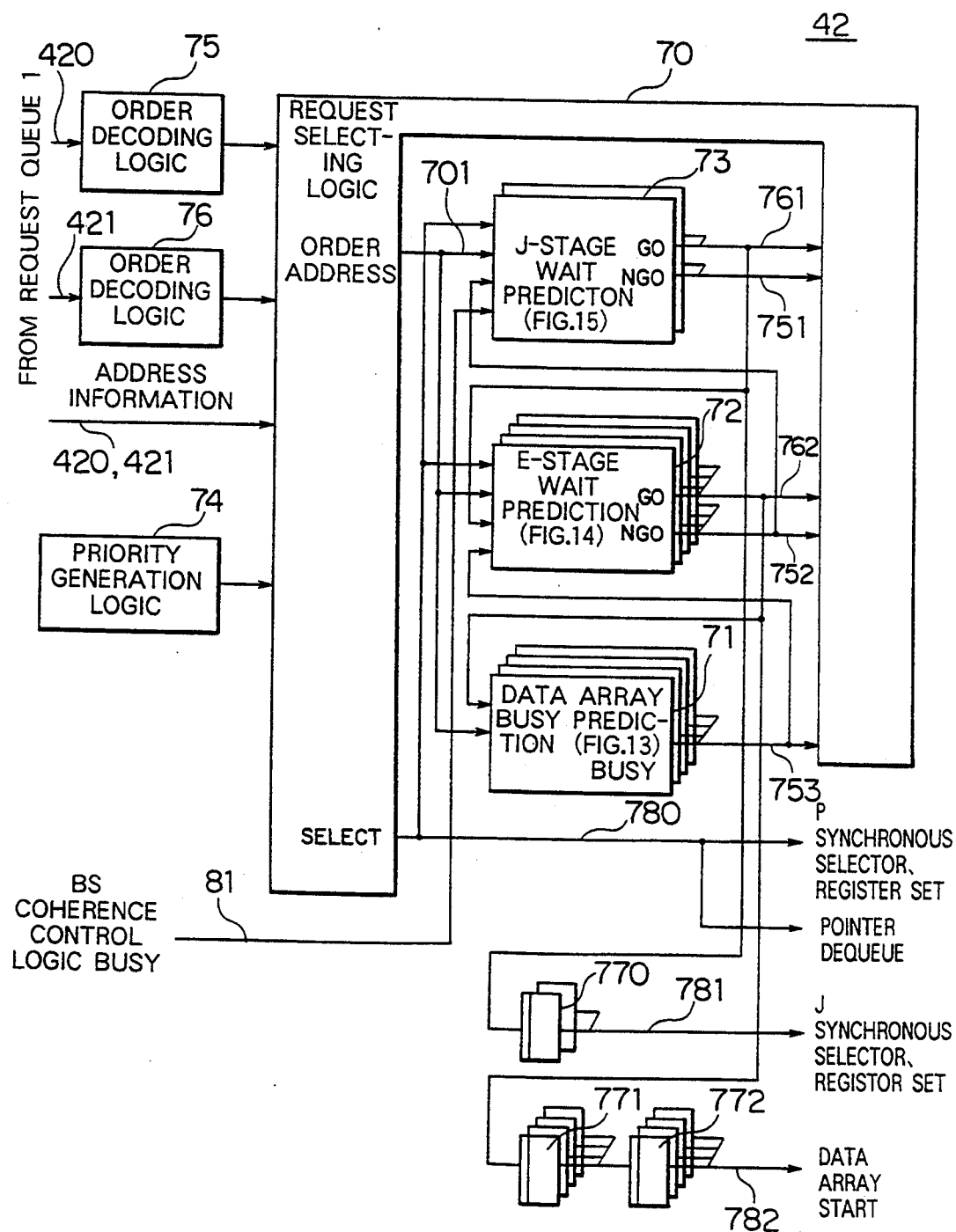
FIG. 3 is a block diagram showing the structure of the request selection logics in the shared buffer storage equipment of the present invention.
Figure 4:
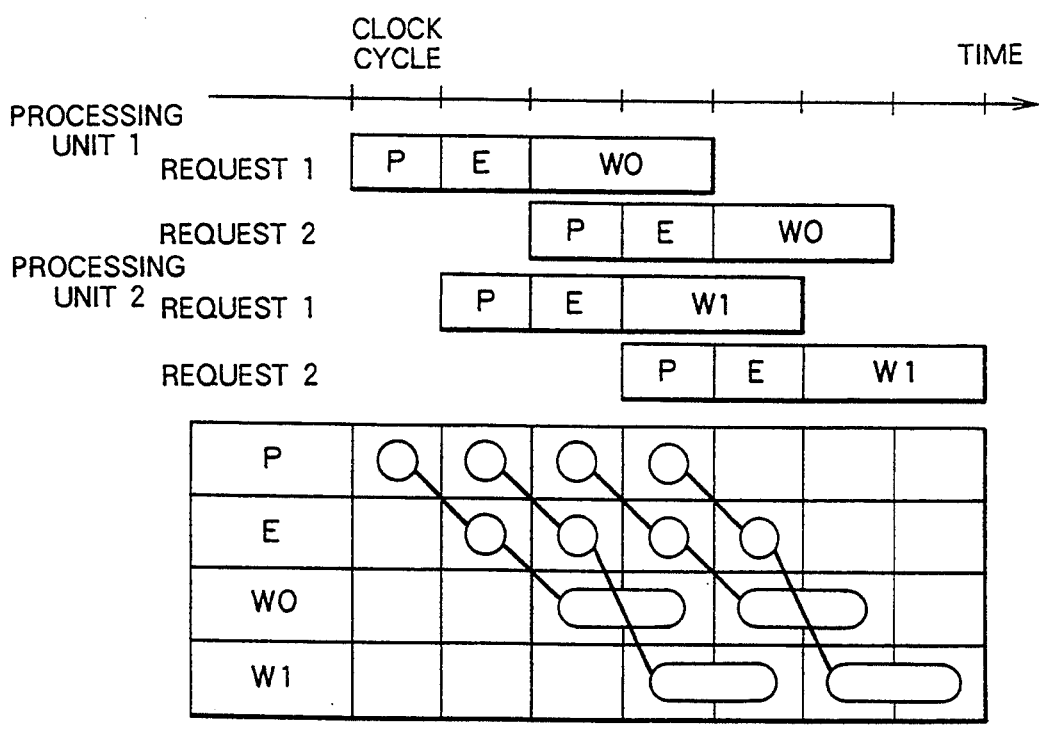
FIGS. 4 to 6 are diagrams showing the flow of conventional pipelines.
Figure 5:
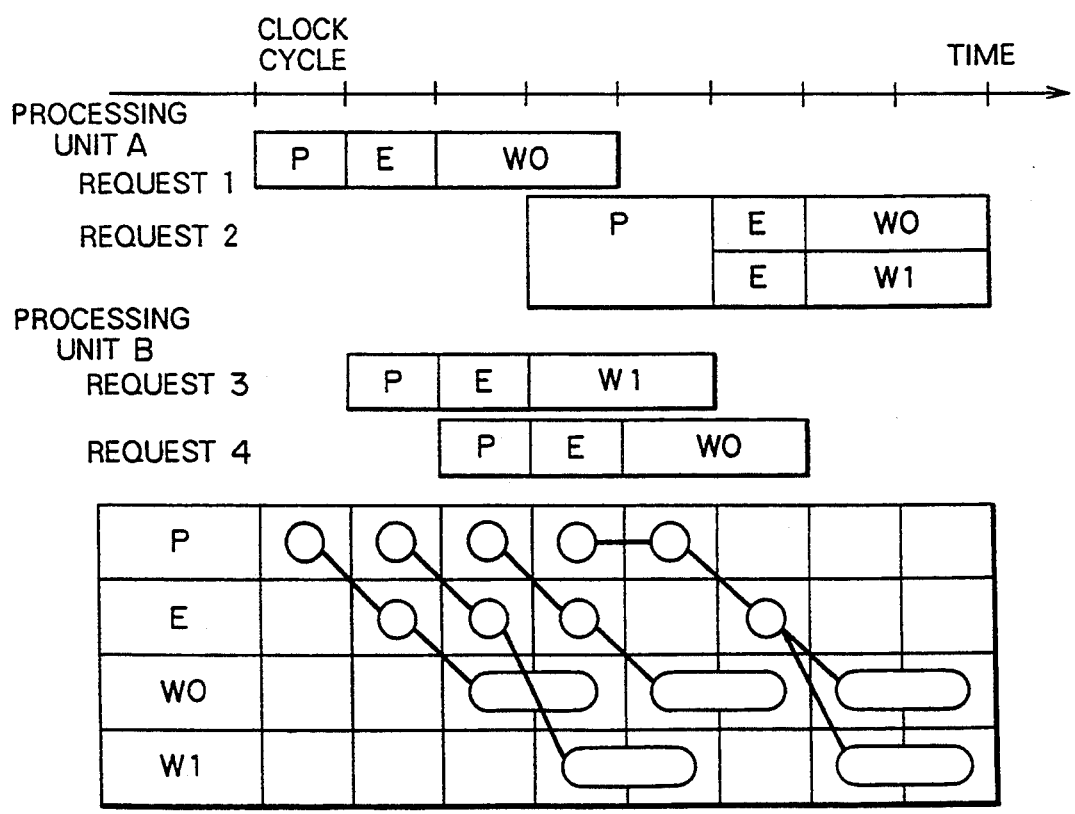
Figure 6:
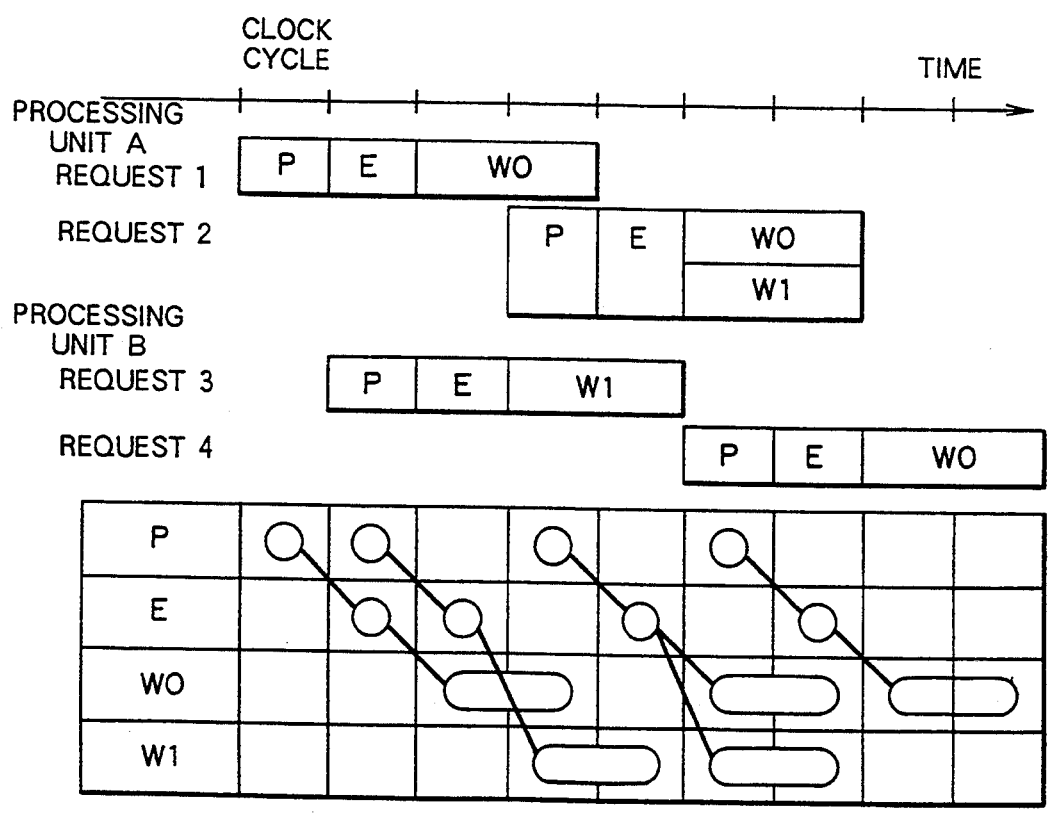
Figure 7:
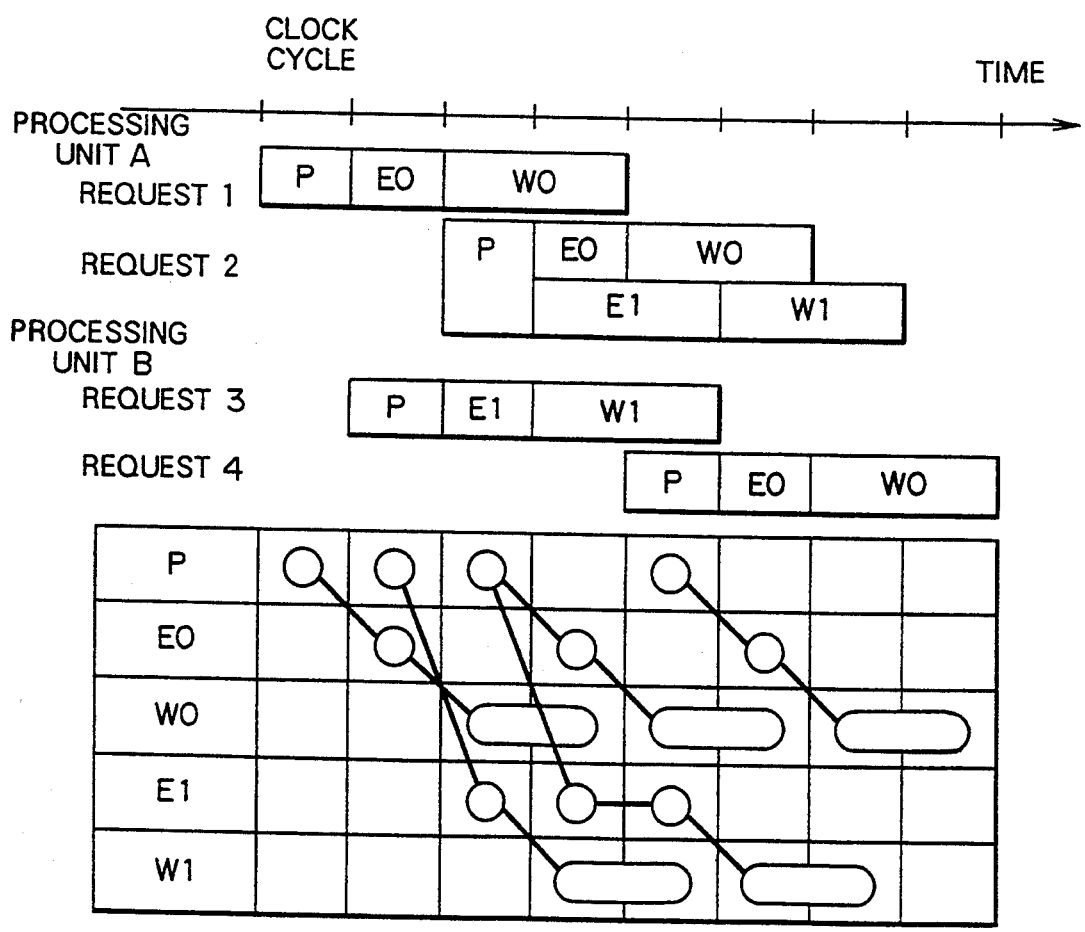
FIG. 7 is a diagram showing the flow of the pipeline according to the present invention.

The configuration of the WS 4 in the present embodiment will be explained below with reference to FIGS. 1 and 3. FIG. 1 shows an outline of the configuration of the WS 4. FIG. 3 shows a detailed structure of a request control logic 42 in FIG. 1. The logic 42 includes a logic arrangement for selecting a request supplied from the processing unit 10 or 11 and for controlling the request to be processed in a pipeline manner (hereinafter to be referred to as a priority control system logic).

The directions of the read and write requests to the WS 4 from the processing unit 10 or 11 in the present embodiment are shown below.

(1) a request for block transfer to the BS 101 or 102 within the processing unit.

(2) an updating request, for updating data stored in the main storage unit 9 in an 8-byte width. (This is referred to as a full store.)

(3) an updating request for updating only a part of data of 8-byte width stored in the main storage unit 9. (This is called a partial store.) There are three types of information that designate the direction of the request, i.e., ① an address of the main storage unit 9, ② the content of an operation to be requested to the main storage unit 9 (hereinafter to be referred to as an order), that is, the designation of either reference or updating, and ③ data to be written in the case of updating.

In FIG. 1, a request from the processing unit 10 or 11 to the main storage unit 9 is processed in a pipeline fashion within the WS 4. A pipeline has processing mechanisms of fine stages. The processing at the respective stages is as follows.

① P Stage: take out a request 12 or 13 supplied from the processing unit 10 or 11 from queues 411 or 412, and 414 or 415 and set it in registers 435 or 436 and 437 or 438 for an address, data and order used at a J stage.

② J Stage: refer to an address array 440 or 441 by using, as a key, the address included in the request taken out at the P stage, and determine whether the address is within the WS 4.

③ E Stage: transfer the request taken out at the J stage to a specified one or more of WS data arrays 50 to 53.

④ S Stage: transfer the address and data to a specified memory device 511 within each of the WS data arrays to which the request is transferred.

⑤ W Stage: read out data from the memory device and transfer the data to the processing unit.

Each of the J to W stages of the pipeline has resources used during the operation of each stage. The processing when a single request has been supplied will be explained below in detail, based on the flow of the processing shown in FIG. 1.

The request arriving from the processing unit 10 or 11 is queued until it is executed. The processing unit 10 or 11 has its own independent queue. In FIG. 1, an address and an order are stored in the request queues 411 or 412, and write data is stored in the request queue 414 or 415. For the requests in one queue, the queued requests are processed in a FIFO (first-in and first-out) manner. If the queue 411 or 412 is supplied to the request control logic 42 through a control line 420 or 421, the request will be selected under a certain condition. The condition will be described later together with a description of the control logic.

In the processing at the P stage, many requests stored in each queue (hereinafter to be referred to as queue requests for the purpose of simplification) are sequentially taken out in the order of the oldest arrival request, and a decision is made about the selection of one from among the queue requests to be taken out, based on various conditions, such as conflict with preceding requests, conflict with requests in other queues, and priority. Thus, in order to use a request at the next stage, the request is selected by a selector 431 or 432. The address and order indicating the content of the request are set in a P synchronous register 435 or 436 to be used at the next J stage. For the write processing which requires write data, the write data is set in a P synchronous data register 437 or 438. The selectors 431 to 434 and the P synchronous registers 435 to 438 are collectively referred to as a P synchronous resource hereinafter. A request selection processing is carried out by the request control logic 42 (FIG. 3), and a maximum of two requests can be selected at a time. In this case, it is not possible to accept two requests from the same processing unit at the same time.

The request selected at the P stage is processed at the J stage. At the J stage, the address and order set in the P synchronous registers 435 or 436 are used to refer to an address array logic 440 or 441 to test whether the requested data has been stored in WS data arrays 50 to 53. The address array logics 440 and 441 are duplexed so that two requests can be processed simultaneously at the J stage. The following processing is carried out when it has been determined that the data to be obtained exists in one or more of the WS data arrays 50 to 53 as a result of reference to and testing of the address array logic 440 or 441. In other words, in order to send the request of the J stage to one or more of the specified WS data arrays 50 to 53 in accordance with the kind of the request and the address of the requested data, the address and order are set in one or more of J synchronous registers 470 to 473 corresponding to the specified WS data arrays 50, 51, 52 or 53 through one or more selectors 460 to 463. In the case of data write processing, write data is also simultaneously set in one of data registers 474 to 477 through one of selectors 464 to 467. A starting signal 782 is sent from the request control logic 42 to each of the data arrays 50 to 53. The address and order are sent to the BS coherence control logic 8 through a signal line 80 in synchronism with the J stage. The selectors 460 to 467 and the registers 470 to 477 to be used for the processing at the J stage are collectively referred to as a J synchronous resource.

Figure 9:
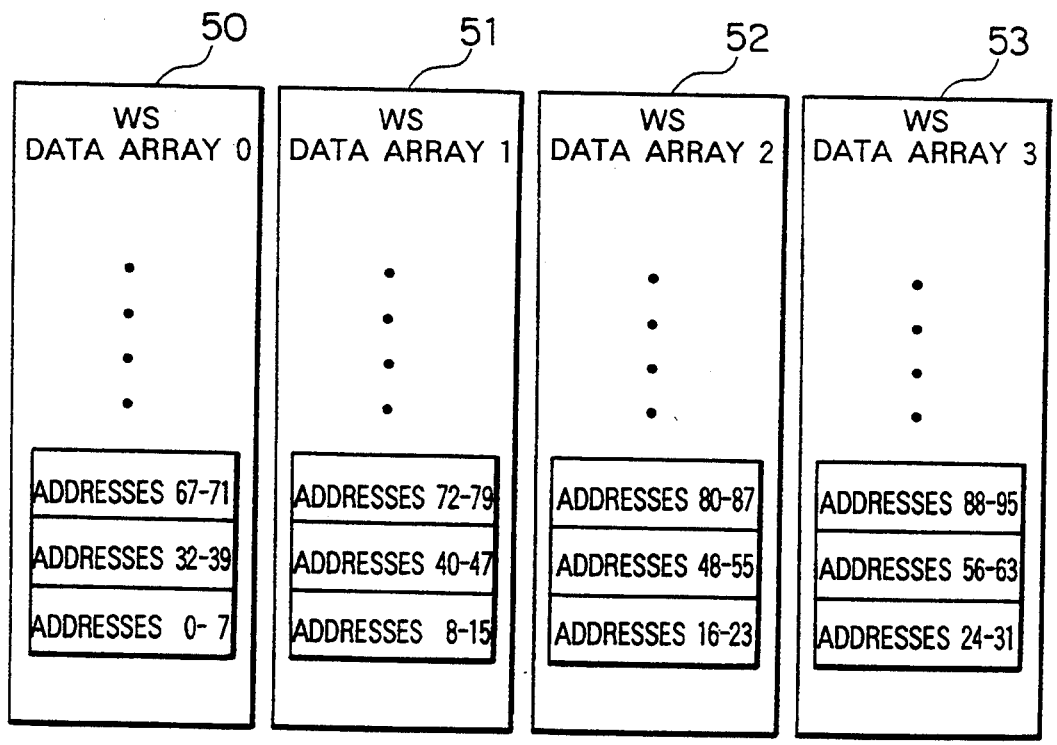
FIG. 9 is a diagram showing the correspondence between an address and the WS data array.

The inside of each of the WS data arrays 50 to 53 is divided into eight byte address locations, and the address is mapped to each WS data array in a circulating manner. The state of data allocation within the WS data array according to the address is shown in FIG. 9. When all the WS data arrays 50 to 53 are read simultaneously, data of 32 bytes can be obtained from consecutive addresses, and the 32-byte data is to be sent to the processing unit 10 or 11 through buffer 520 or 521 within each WS data array. In the present embodiment, a memory device requiring two clock cycles for data read or write processing is used as a WS device. Each of the WS data arrays 50 to 53 has a memory part (RAM) 510 which can operate independently. Each of the WS data arrays 50 to 53 starts an operation in response to receipt of an activation signal 782 from the control logic 42. The operation is controlled by control logic 531 within each data array. The data within the data array is processed at three pipeline stages E, S and W.

The control logic 531 which has received the starting signal 782 sets those values of the J synchronous registers 470, 471, 742 or 473 and 474, 475, 476 or 477 which have been set at the J stage, in the E synchronous registers 541 and 542.

At the next S stage, the value set in the E synchronous register 541 is transferred to the register 512 within the memory device. At the last W stage, data from the memory part is transferred to one of the buffers 520 to 522 so that the data is transferred to the requesting processing unit. The processing within each data array changes depending on the direction or content of the request from the processing unit 10 or 11. Of requests to the WS 4, three main types of processing, i.e., a request for block transfer to a processing unit, a full-store request and a partial store request will be explained with reference to FIGS. 10 to 12. Many of the structural elements in FIGS. 10 to 12 which are not relevant to the following explanation will not have reference symbols or numerals.

(1) Block transfer

Figure 10:
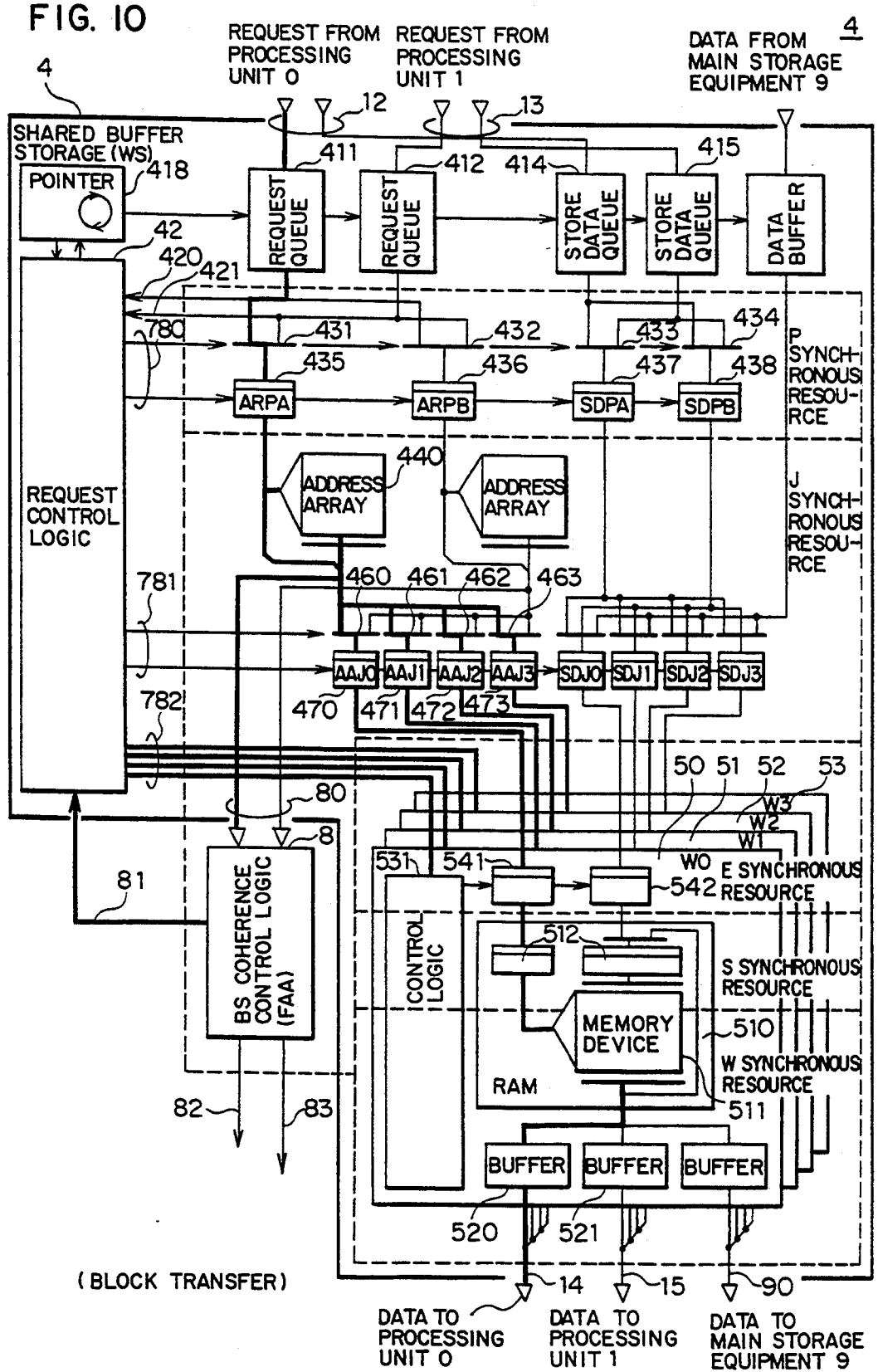
FIG. 10 is a block diagram showing the flow of data at a time of reading the block of data.

The flow of an address and data during block transfer are shown by thick lines in FIG. 10. The BS 101 or 102 within the processing unit 10 or 11 manages data in units called a block, and data read processing is carried out in this unit of a block. In the block transfer, the information provided from the processing unit 10 or 11 is an order and an address of a request. In the present embodiment, the block size is 32 bytes, and this 32-byte data is obtained by activating all the WS data arrays 50 to 53. The direction of the request from the processing unit is supplied to the request control logic 42 through the signal line 420 or 421 for the order and address, so that the request control logic 42 controls the subsequent operations. In the block transfer request, the address and order of the request are selected by the P synchronous selector 431 or 432 at the time when the request control logic 42 has received the request, and the address and order are set in the P synchronous register 435 or 436 which is connected to the selector 431 or 432. In the case of a block transfer request, write data is not involved, so that the write data queues 414 and 415, selectors 433 and 434 and registers 437 and 438 are not operated. FIG. 10 shows the operation in the case where the request uses the register 435. At the J stage, the address array 440 is referred to and tested by using the address. When a data block to be obtained is found in the WS 4, the address and order are sent to the four data arrays 50 to 53, to activate the four data arrays 50 to 53. Data of the designated block is read out from the data arrays 50 to 53 and is transferred to the requesting processing unit 10 or 11. In this case, all elements of the activating signal 782 to the data arrays need not be sent simultaneously. The control method for this will be explained later with reference to FIG. 8. In each of the data arrays 50 to 53, after the starting signal 782 element has been received, the memory device is started to read a part of the data, and the data part is stored in the buffer 520 or 521 within the WS data array. Then, the data is transferred to the processing unit 10 or 11. The data is read out from the WS data arrays in units of 16 bytes, taking two clock cycles.

In the request for a block transfer, the execution of instructions in the processing unit is kept in a waiting state until the data necessary for the processing within the processing unit 10 or 11 (hereinafter to be referred to as target data) has reached the processing unit 10 or 11. Therefore, in order to prevent lowering of the performance, it is necessary that a period from the time when the request has been received to the time when the block data, i.e., the target data, has been sent is short.

(2) Store Processing (Full Store, Partial Store)

Store processing can be divided into two types of processing, i.e., full store processing and partial store processing. The full store processing updates the whole eight bytes of the data array width, and the partial store processing updates only a part of the 8-byte data array width. In the present embodiment, a check code is prepared for the data width of each data array, i.e., for each eight bytes, in order to improve the reliability of the data of the WS 4. And, when the data array is updated, the check code must be updated, too.

Figure 11:
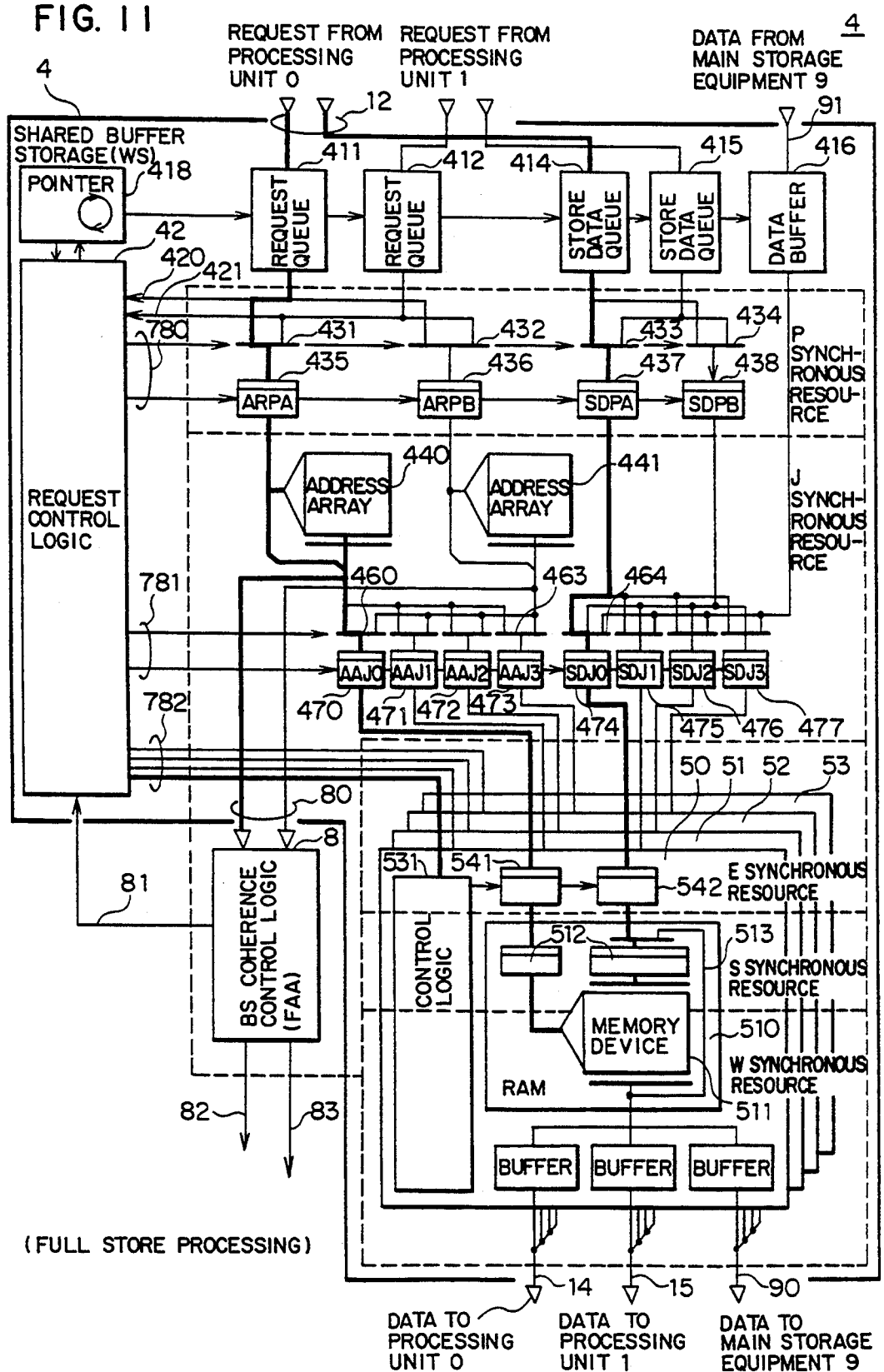
FIG. 11 is a block diagram showing the flow of data at the time of the processing of the full store.
Figure 12:
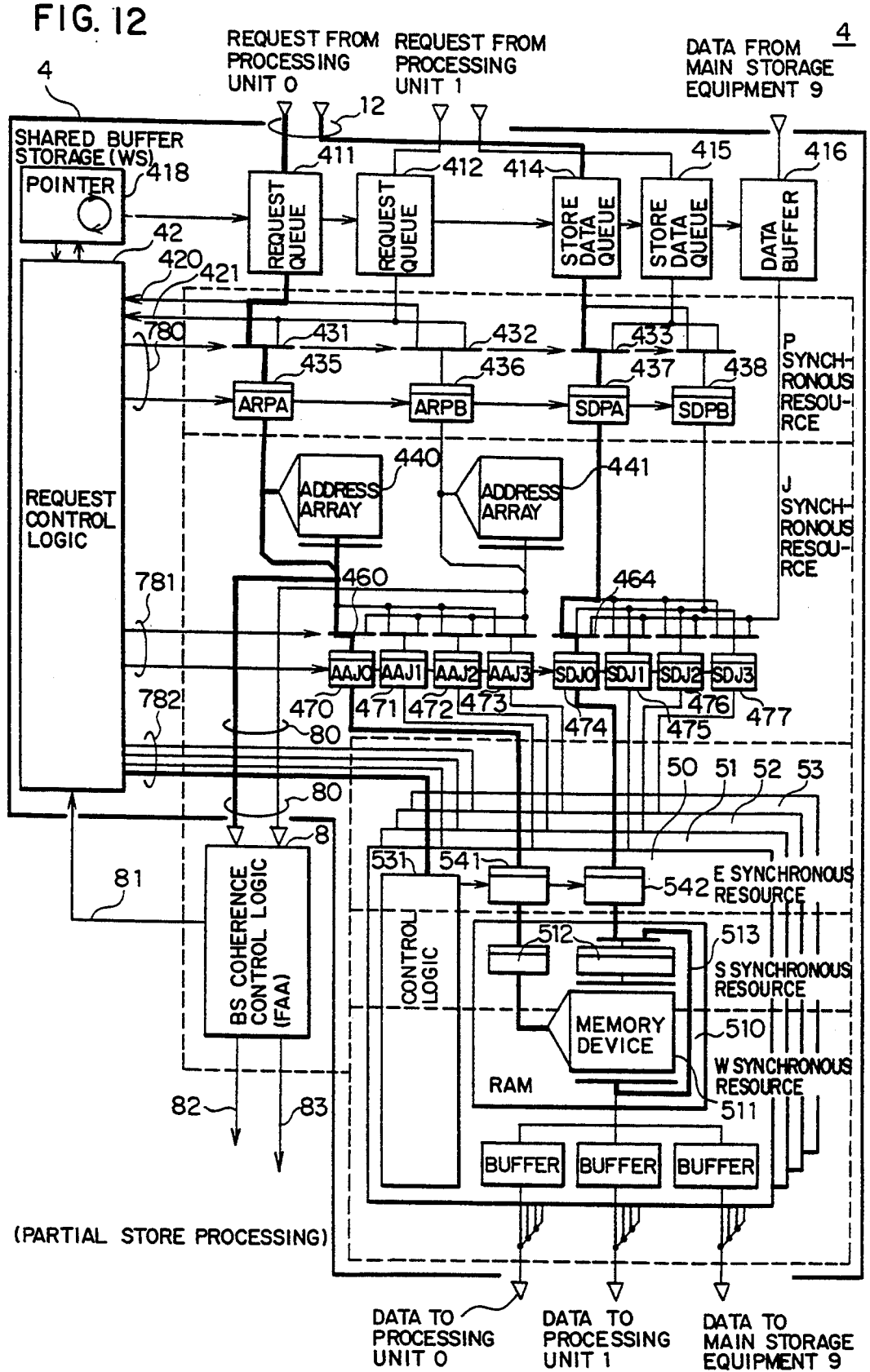
FIG. 12 is a block diagram showing the flow of data at the time of processing a partial store.

The partial store processing and full store processing differs in this check code update process. Since the partial store process updates only a part of the data array width, the check code must be re-calculated by merging the update data and the rest of the data which is is read from data array but not updated. The address and data flows in the full store processing and in the partial store processing are shown in FIGS. 11 and 12 by thick lines, respectively.

Address queuing, request selection and reference and testing of the address arrays in the store processing are the same as those in the block transfer processing. However, in the store processing, the width of data to be processed is small and so only one of the WS address arrays 50 to 53 is to be activated. At the same time, the updated data is simultaneously taken out from the store data queue 414 or 415 which queues the updated data inputted from the processing unit 10 or 11, and the taken out data is sent to one of the WS data arrays 50 to 53. The P, J and E stages perform the same processing as those in the block transfer processing. However, in the case of the store processing, store data is taken out from the store data queue 414 or 415 and set in the P synchronous register 437 or 438 and subsequently in one of the J synchronous registers 474 to 477.

In each WS data array 50, 51, 52 or 53, two cycles are necessary for one full store processing. On the other hand, in the case of the partial store processing, data is first read from the memory device and then the check bit is re-calculated based on this data. Therefore, in the case of the partial store processing, each WS data array becomes busy during the period of six cycles.

In the present embodiment, the BS employs the store-through system. Therefore, a store request sent by the processing unit 10 or 11 is directly sent to the WS. Accordingly, the data width of store data is ¼ to ⅛ of the data width at the time of the block transfer processing, i.e., four bytes, or eight bytes of ¼, and as a result the number of requests is more than occurs in the block transfer processing. On the other hand, in the case of the store processing for the memory, it is not necessary to process the data in synchronism with the execution of an instruction so long as the data consistency is guaranteed by logic control, excluding the case where serialization is necessary in execution of a control instruction or the like. There is no direct influence on the system performance due to the latency of the processing time in response to the store request. Accordingly, in the processing of the store request, the system is designed such that the throughput of the request has a higher priority than that of a response.

Figure 8:
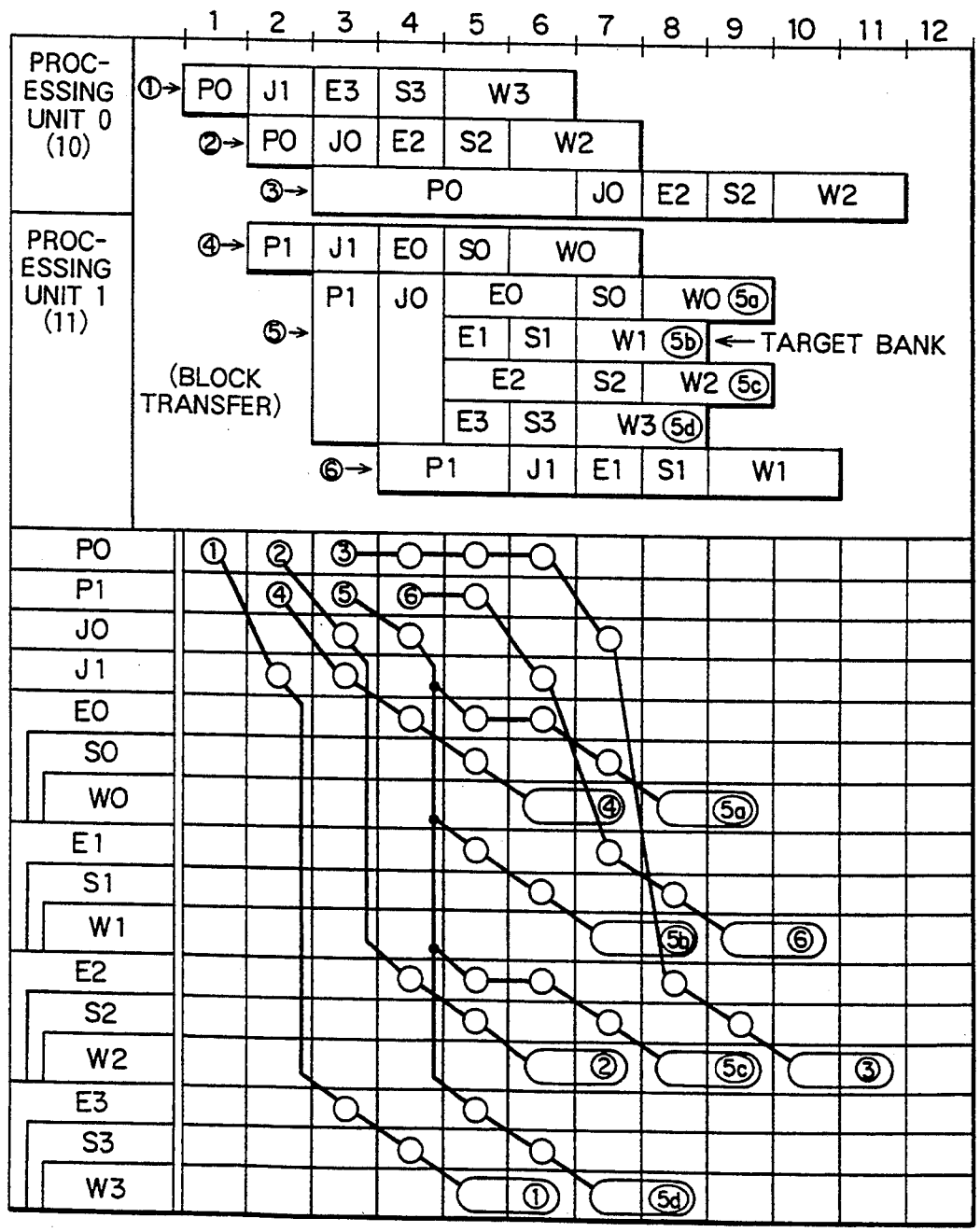
FIG. 8 is a diagram showing the flow of the pipeline in an embodiment of the present invention.

The control operation of the buffer storage equipment will be explained next. First, an example of the timing charts of control of the WS 4 in this embodiment is shown in FIG. 8. The lower portion of FIG. 8 illustrates the flow of data transfer between the stages, i.e., the flow of the processing for each request.

(n) (n=1 to 6) in FIG. 8 is an indication for discriminating requests inputted from the processing unit 10 or 11.

Particularly, ①  to ③ denote the requests inputted from the processing unit 0 (10), and ④ to ⑥ denote the requests inputted from the processing unit 1 (11). Each portion shown as ○—○ within the same stage indicates the state that the request is waiting during two cycles or a longer time.

The request for the work buffer storage 4 is processed in a pipeline manner. The pipeline includes the four stages of P, J, E and S which operate in one machine cycle pitch and the stage W which is the data write processing in the memory device, totalling the five stages, as described above.

When the requests from the processing unit 10 or 11 have been transmitted to the shared buffer storage (WS) 4 of the system control unit 3, the requests are sequentially sent to each of the subsequent J, E, S and W stages, as described above, and the data arrays 50 to 53 for storing the data are started to read or write data. In this case, the requests in each stage are processed independently of each other, and the resources do not conflict with each other, so that one of the requests can be selected at the P stage for each cycle. In this case, the received sequence or order of the requests from each processing unit to the system control unit 3 is kept for each of the processing units 10 and 11. In other words, each of the request queues 411 and 412 for storing the requests from the processing unit 10 and 11 keeps the first-in first-out (FIFO) rule with respect to each processing unit. However, there is no relation between the processing units with respect to the request arrival order and the processing order. In order to prevent the requests from waiting for a long time, the priorities of the processing units are controlled so that the requests can be served during a certain reasonable time period. In the following explanation, the request from the processing unit 10 or 11 shall mean the oldest request, i.e. the one which is at the head of the request queue.

At the P stage, at most two requests are selected from among the requests from the processing units 10 and 11 which have been received up to a certain time and the two address arrays 441 and 442 which are the resource of the J stage are referred to and tested. As well as the buffer coherence control 8, the reference, test and update of the buffer storage unit 101 or 102 of the processing unit and a update of the main storage equipment 9 are performed. The requests existing in the stage J, as seen in FIG. 8, are called J0 and J1 corresponding to the address arrays 440 and 441. In this pipeline control, it is possible to make the request wait at the three stages of P, J and E. The state that the requests are caused to wait at the P stage is the state wherein the requests from the processing units are not selected, and so the requests are kept waiting in a queue until they are selected. At the J stage, the requests are kept waiting in either one of the following two cases:

(1) when a request to be processed at the E stage is kept waiting in the same WS data array that is used by a request selected at the P stage, or (2) When the processing of the J stage cannot be executed because a resource such as the buffer coherence control logic is busy.

In each of the E, S and W stages, the number of requests which can exist is determined by the number of WS data arrays 50 to 53, that is, at most four requests can exist at the same time in the disclosed embodiment. The operation of each data array can be controlled independently. In FIG. 8, the four requests existing in the respective stages are assigned with subscripts from 0 to 3 in correspondence to the WS data arrays 50 to 53 to distinguish the requests to be processed in the respective data arrays. As described above, it is possible to make the request wait in the E stage, and the request is kept in the E stage when one of the WS data arrays 50 to 53 corresponding to the request is busy.

In the present embodiment, the shared buffer is so controlled that out-of-order control of the succeeding requests is not effected at the J stage in order to guarantee the request order, as explained in the discussion of the prior art technique. In other words, despite the capability of processing at most two request at the same time in the J stage, no additional succeeding requests is selected at the P stage even if one of the address arrays 440 and 441 is available.

On the other hand, at the E stage, the buffer is so controlled that out-of-order processing within the same data array is not effected, but the out-of-order processing between different data arrays is permitted. In other words, at the E stage, when a request is kept waiting in one of the WS data arrays 50 to 53, it is so controlled that the request which requires this WS data array is not transferred from the J stage to the E stage. No wait processing is carried out at the E stage or afterward and the processing is terminated within a period of a predetermined time corresponding to the direction of the request. The operation of FIG. 8 will be explained below by taking an example of the flow of the pipeline processing executed under the above-described control.

For the sake of simplicity of the explanation, it is assumed that requests from the processing unit 0 (10) arrive one at each cycle from the first cycle to the third cycle and the requests from the processing unit 1 (11) arrive one at each cycle from the second cycle to the fourth cycle. The directions of the requests inputted from the processing unit 0 are shown below.

① the full store processing using the WS data array 3 (53) (request ①)

② the full store processing using the WS data array WS 2 (52) (request ②)

③ the full store processing using the WS data array WS 2 (52) (request ③) The directions of the requests inputted from the processing unit 1 (11) are shown below.

④ the processing using the WS data array W0 (50) (request ④)

⑤ the block transfer processing using all of the WS data arrays 50 to 53. In the processings to be described below, the block transfer request ⑤ is divided into 5a , 5b , 5c and 5d for each WS data array (W0-W3) to be used (request ⑤). Particularly, the target data is sent from the data array W1 (51). The data array storing the target data is called a target bank.

⑥ the full store processing using the WS data array W1 (51) (request ⑥) The processings of the WS 4 for the operation shown in FIG. 8 are explained below.

(1) In the first cycle, only the request ① inputted from the processing unit 0 exists. Since it is estimated that the WS data array 3 to be used is not busy, the request ① is immediately sent to the J stage (J1).

(2) In the second cycle, the request ② inputted from the processing unit 0 is for storing data in the WS data array W2, and the request ④ inputted from the processing unit 1 is for storing data in the WS data array W0. The WS data arrays used by both requests are different from each other and these requests do not conflict with the preceding request ①. Therefore, both requests ② and ④ are sent to the J stage (J0, J1).

(3) In the third cycle, the request ③ inputted from the processing unit 0 is for storing data in the WS data array W2, and the request ⑤ inputted from the processing unit 1 is a block transfer processing request for transferring data to all of the WS data arrays W0 to W3. Since these requests conflict with the WS data arrays to be used in the subsequent stages (J and afterword), both of the requests ③ and ⑤ can not be selected simultaneously.

In this case, the priority of the block transfer request ⑤ is higher than that of the request ③, so that the block transfer request ⑤ from the processing unit 1 is selected first. In this case, the preceding requests ② and ④ are not delayed but are transferred from the J stage to the E stage.

(4) In the fourth cycle, all of the WS data arrays W0 to W3 become busy because the block transfer request ⑤ selected in the third cycle is being processed (J0). Accordingly, none of the store requests inputted from the processing unit 0 can be selected. The preceding requests (①, ②, and ④) are all transferred to the next stages without waiting. The processing for the other requests ③ and ⑥ will be explained later.

(5) In the fifth cycle, the two store requests ② and ④ selected in the second cycle and the block transfer request ⑤ selected in the third cycle conflict with the WS data arrays W0 and W2. Therefore, of the block transfer request ⑤, the block transfer requests 5a and 5c for the WS data arrays W0 and W2 are required to wait at the E0 and E2 of the E stage. On the other hand, the full store request ① using the WS data array W3 inputted from the processing unit 0 and the new store request ⑥ using the WS data array W1 inputted from the processing unit 1 in the preceding fourth cycle are to be processed. In this case, the E stage is busy because the preceding requests ⑤ and 5c are waiting. Accordingly, the store request ③ which has been inputted from the processing unit 0 and which uses the WS data array W2 can not be selected. Therefore, the request ③ is kept waiting at the P stage P0 in the fifth cycle, too. The store request ⑥ does not conflict with the preceding requests ④ and ⑤ so that the request ⑥ can be transferred to the next J stage J1.

(6) In the sixth cycle, both requests 5a and 5c which have been waiting at the E stage do not conflict with previous requests and are transferred to the next S stage S0 and S2. The store request ③ does not conflict with the preceding requests, so that the request ③ can be transferred to the next J stage. The other requests are transferred without waiting.

(7) In the seventh cycle, there are no more requests to be selected. Accordingly, all the inputted requests are transferred without waiting in the subsequent cycles.

The above is the outline of the selection process of the store requests. The block transfer request ⑤ selected in the third cycle a conflict with respect to the WS data arrays with the requests ①, ②, and ④ selected in the preceding first and second cycles. Accordingly, the block transfer request ⑤ is kept waiting until the busy state of the WS data arrays generated by the preceding request has ended.

An example of the request control logic 42 for selecting a request, as described above, will be explained with reference to FIG. 3. FIG. 3 shows the logical arrangement for carrying out the selection of the request at the P stage in the present embodiment. The selection algorithm of the P stage is shown below. The request selection logic of FIG. 3 is a combination logic to fulfill the following algorithm.

(1) No new request is selected when a preceding request is waiting at the J stage, regardless of the kind of the new request.

(2) When a block transfer request has been selected in a cycle immediately before a current cycle, no request is selected because all of the WS data arrays are busy in this case.

(3) When at least one of the requests inputted from the processing units 0 and 1 is a block transfer request and when any requests are predicted not to be waiting in the E stage after one cycle, the block transfer request is transferred to the J stage. When this condition is not met, the block transfer request is not transferred to the J stage because there occurs a waiting state in the J stage when the E stage is busy.

If there are two block transfer requests one request is selected that satisfies the following two conditions.
  ① The WS data array for the target data is not busy after two cycles.
  ② When the plurality of block transfer requests meet the above condition ① or when none of the plurality of block transfer requests meets the condition ①, a request having the highest priority is selected in accordance with the priorities prepared separately.

(4) When the requests from the processing units 0 and 1 are store requests, a maximum number of selectable requests are selected from among the requests which do not conflict with the preceding requests. In other words, from among the store requests inputted from the processing units 0 and 1, the requests which satisfy all the following conditions are selected.
  ① No requests will wait one cycle later at the E stage corresponding to the WS data arrays 50 to 53 which the request to be selected uses to store. This is a condition that the selected request won't wait in the J stage because the WS data array is busy.
  ② When the selected request arrives at the WS data arrays 50 to 53, that is, three cycles later, the data array for newly storing data is not busy. From among such requests that meet the above conditions, a maximum number of requests is selected in such a manner that the requests don't use the same WS data array. If there are a plurality of store requests which meet the conditions, requests are selected in accordance with priorities to be prepared separately.

The logic of FIG. 3 for realizing this algorithm includes three sections of a predicting logic, which include the logic 71 for predicting the busy state of the WS data array for the selected request and the logics 72 and 73 for predicting the waiting of the requests in the E and J stages, a request selecting logic 70 for selecting a request to be sent to the J stage based on the predicting results of the waiting and busy state and priorities among the processing units, and a priority generation logic 74 for generating priorities among the requests. The structure of each of the logic sections will be explained in sequence.

The request selecting logic 70 for selecting a request will be explained first. In the request selecting logic 70, the selection algorithm based on the priorities between the processing units 0 and 1 and the request selection algorithm are the same, and the respective request selecting logics for the processing unit 0 and 1 have the same structures. Accordingly, the structure of the request selecting logic for the instruction processing unit 0 will be explained below. A similar logic for the processing unit 1 can be obtained by replacing all the logical values from 0 to 1 and all the logical values from 1 to 0. An expression for deciding which request should be selected comprises two-stage combination logics. The first stage logic decides whether the designated request conflicts with the preceding requests and selects a request which does not conflict. The second stage logic decides whether the request should be actually selected or not, taking into account its priority. A decision expression for the conflict conditions among the requests in the first stage is given by the following equation (1).

$$RQV_0 = \qquad (1)$$
$$RQE_0 \& ( \overline{BP} ) \& \left( (RQO_0 = BT) \& \left( \sum_{j=0}^{7} (RQB_{0j} \& \overline{BB_j}) \right) \right) +$$
$$\left( \sum_{i=0}^{3} (RQW_{0i} \& \overline{BW_i}) \right)$$

All the variables included in the above equation (1) are logical variables. When the following conditions are met, the values of the respective logical variables become 1, and when the following conditions are not met, these become 0. The above equation (1) is one when a subscript K of each of the following variables is 0.

RQV$_K$: The request from the processing unit K does not conflict with the preceding requests.
RQE$_K$: There is a request from the processing unit K.
BP: The stage J will be busy.
RQO$_K$=BT: The request is a block transfer request.
BW$_i$: The E stage for the WS data array i will be busy.
RQB$_{Kj}$: The request uses the WS data array j as a target bank.
RQW$_{Ki}$: The request uses the WS data array i.
BB$_j$: The WS data array j is busy.
⎯ : This shows logical NOT.
& : This shows logical product.
+ : This shows logical sum.

The first term (RQE$_0$) of the equation (1) is a logical expression for deciding that there is a request to be selected and the second term ($\overline{BP}$) of the equation (1) is a logical expression for deciding that there is no waiting request at the P stage. The third term is a logical expression for deciding whether preceding requests conflict with the request under consideration. The first section (a logical expression including RQO$_0$, BT, RQB$_{0j}$ and BB$_j$) is a decision equation for a block transfer request. This is a logical expression for deciding that, in the case of a block transfer request, when a data array for sending target data is busy because of the preceding request, the block transfer request is not selected and that the request is selected even if other data arrays not including the target data are busy. The second section (a logical expression including RQW$_{0i}$ and BW$_i$) is a logical equation for deciding the condition that a store request is not selected when the data array to be used is busy.

An equation (2) for selecting a request in the second stage is shown below.

$$SL_0 = RQV_0 \& \qquad (2)$$
A $(( \overline{RQV_1})$
B $\left( \sum_{j=0}^{3} (RQB_{0j} \& RQB_{1j}) \right) \&$
$\left( \sum_{i=0}^{3} (RQW_{0i} \& RQW_{1j}) \right))$
C $+ ((RQO_0 = BT) \& ( \overline{(RQO_1 = BT)}))$
D $+ PV_{01})$ SL$_K$: Of the requests inputted from the processing unit K, a request that can be processed at the J stage is selected.
PV$_{01}$: The priority of the processing unit 0 is higher than the processing unit 1.

The second term of the second equation (2) is a logical expression for deciding whether the request that can be processed at the J stage among the selected requests that have been inputted from the processing units should be actually selected or not by using the priority among the processing units at that point of time. Requests which do not conflict with the preceding requests can be selected when at least one of the following four conditions is met.

① There is not another selectable request.
② The WS data array to be used does not conflict with other requests.
③ The request is a block transfer request and all the other requests are store requests. A priority for the block transfer request is set to be higher than priorities for the store requests, so that the block transfer request is processed first.
④ The priority for the corresponding processing unit is higher than that for the other processing unit.

The first section (a logical expression including $\overline{RQV_1}$) within the brackets of the second term shows the above term number Ⓐ, the second section (a logical expression including RQB and RQW) shows the above term number Ⓑ, the third section (a logical expression including RQ$_0$ and BT) shows the above term number Ⓒ, and the fourth section (a logical expression including PV) shows the above term number Ⓓ.

Figure 13:
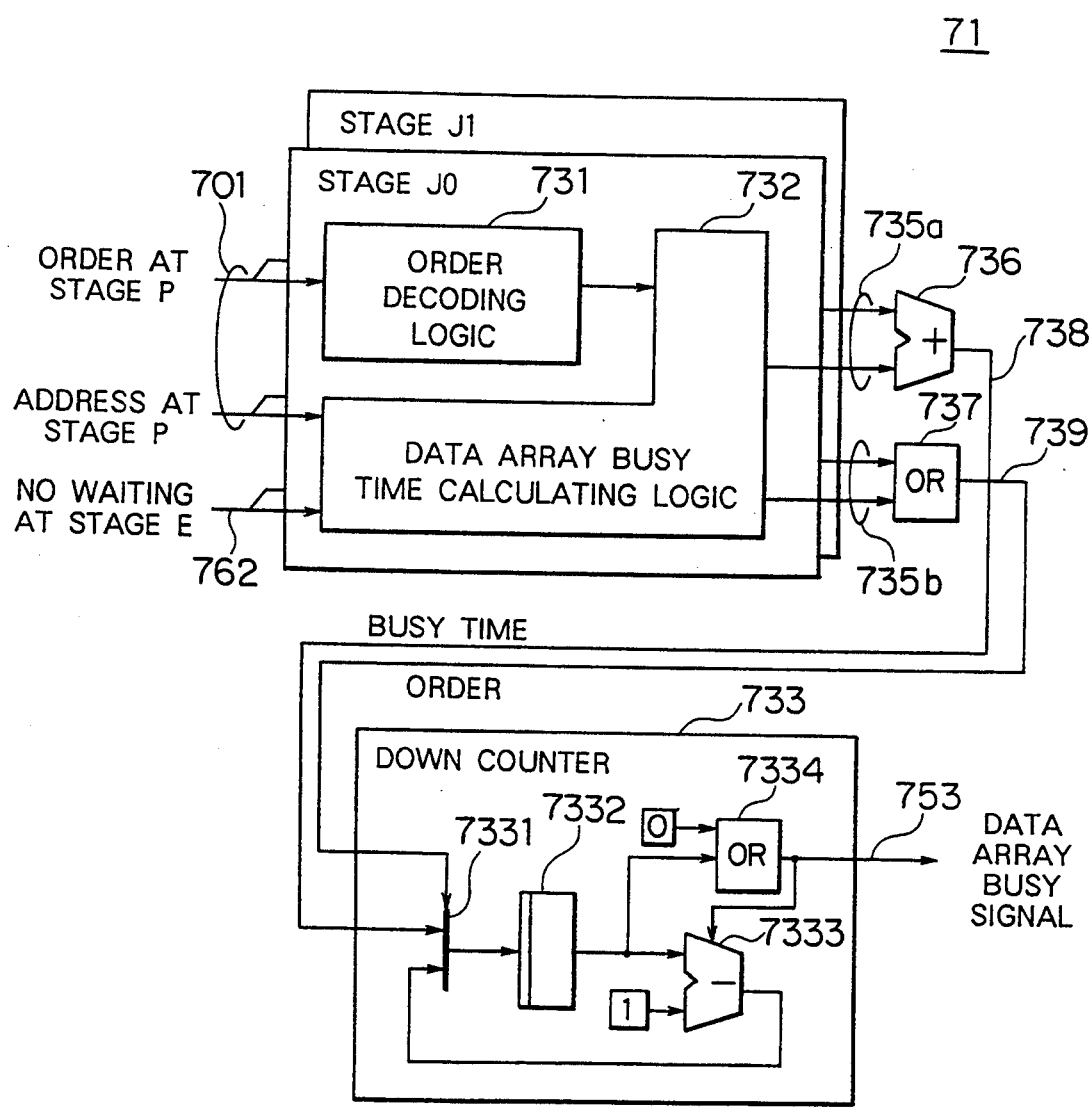
FIG. 13 is a block diagram showing the logical structure for predicting a busy state of the data array.

FIG. 13 shows the detailed structure, for one data array, of the data array busy predicting logics 71 for estimating prediction of busy states of the WS data arrays 50 to 53. There are a total of four logic sections in the logic 71 in correspondence with the WS data arrays 50 to 53, and the busy state of each WS data array is predicted for three cycles before the WS data array will be actually used based on the request order and the WS data array(s) used. The time relation is so structured that the busy state of the WS data array, when a request to be selected to the WS data, is obtained as the output of this prediction logic. The logic 71 comprises three components of a decode logic 731 for a request order, a data array busy time setting logic 732 and a down counter 733 for calculating the busy time. The logic corresponding to each WS data array decides whether it is possible to start the WS data array corresponding to each of the two requests within the J stage when it has been predicted that the request selected at the P stage will not be held at the E stage, and when it is possible to start the WS data array, the logic calculates the time when the data arrays will become busy, based on the request order and address. Two requests existing in the P stage do not simultaneously use the same WS data array. Therefore, at most only one of the two signals included in each of signals 735a and 735b for deciding the starting of the WS data array predicted by the calculation takes a signal value of 1, and at least one of the calculated busy times is 0. Further, a logical sum 737 and an arithmetic sum 736 are generated for the two requests existing in the J stage. As a result, a busy time to be newly set for the WS data array that are used by the two requests existing in the J stage is calculated. The busy time that has been calculated is set in a register 7332 through an input selecting logic 7331 in the down counter 733. The value set in the register 7332 is reduced by 1 by a subtractor 7333 for every clock cycle. When the value becomes 0, the subtraction is stopped. A data array busy signal 753 generated from a logical sum gate 7334 is used as a subtraction stop signal. So long as the value of the counter 7332 is 1 or more, the data array is busy, and this busy information 753 is outputted to the request selecting logic 70 and an E stage wait predicting logic 72.

Figure 14:
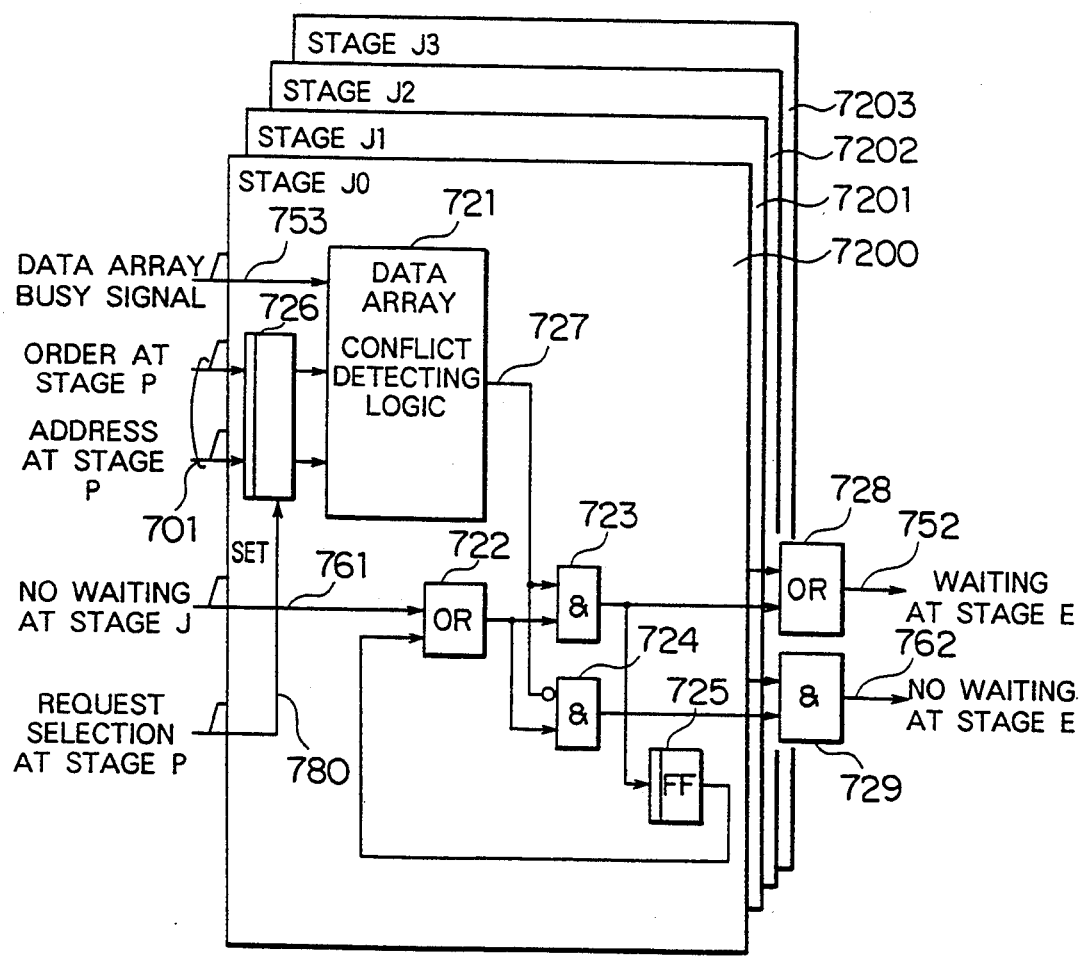
FIG. 14 is a block diagram showing the logical structure for predicting the waiting at the E stage.

Next, FIG. 14 shows the structure of the logic 72 for predicting the waiting of a request at the E stage. This logic 72 includes four logic sets (7200 to 7203) in correspondence with these data arrays 50 to 53, and each logic set predicts the waiting of the request at the E stage for two cycles from the time the selected request actually waits at the E stage. This time relation is the same as the busy predicting logic of the WS data array. The structure of each logic set is provided based on the algorithm which decides "when a request exists in the E stage and when the WS data array to be used by this request is busy at this time, the request waits at the E stage." This logic 72 comprises a data array conflict detecting logic 721 for deciding whether or not the WS data array to the used by this request is busy because of a preceding request and request wait logics 722 to 726. When no request is kept waiting in the E stage corresponding to a certain one of the WS data arrays 50 to 53 (or to be more exact, when there is no request kept waiting in the logic shown in FIG. 14, in other words, when the value of the waiting FF 725 is "0" and the time is two cycles before an actual waiting occurs), it is possible to select a request that uses the stage E, to the stage J. In this case, when it is predicted that the selected request will not be kept waiting at the J stage, it is decided whether the request is not being kept waiting at the E stage. Information of the data array to be used by the request of the stage J is generated based on the order and address, and whether one of the data arrays 50 to 53 to be used conflicts with the preceding request is decided based on the array busy signal 753 from the data array busy predicting logic 71. When they conflict with each other, a signal line 727 takes the logical value "1". In this case, a decision result that there is no waiting at the J stage is reported through a signal line 761 from the stage J wait predicting logic 73, so that the output of the logical sum gate 722 takes a logical value "1". In this case, when the signal line 727 takes a logical value "1", that is, when there is a conflict of the WS data array, the output of the logical product gate 723 is "1" and the output of the logical product gate 724 is "0", so that a decision result that there is a request waiting at the E stage is reported to the stage J wait predicting logic 73 and the request selecting logic 70 through a signal line 752. In this case, a report signal line 762 showing the transfer from the E stage to the S stage remains, taking a value of "0", and the array busy information is not updated by a signal 752 which shows a waiting condition. When the request is kept waiting, the updating of the register 726 which stores the address and order is suppressed by the state of the signal line 752 and the content of the register 726 is held. The request that has been kept waiting is held by the FF 725, and the wait information concerning the E stage is reported until the data array busy signal 753 becomes "0". When the result of the signal line 727 is "0", there occurs no waiting in the E stage, and the signal line 752 takes the value "0" and the signal line 762 takes the value "1", so that the array busy information is updated.

Figure 15:
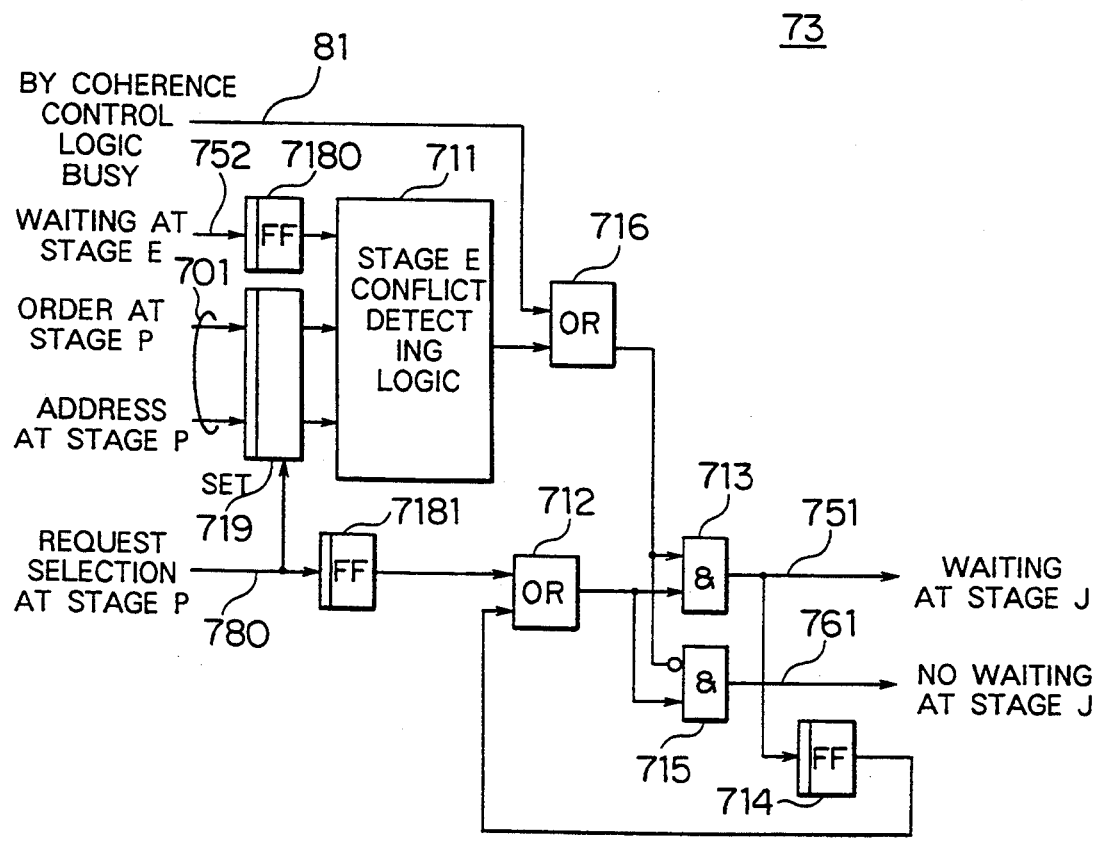
FIG. 15 is a block diagram showing the logical structure for predicting the waiting at the J stage.

Next, FIG. 15 shows the logic 73 for predicting the waiting of a request at the J stage. There are two logic sets of this logic 73 corresponding to respective J stages. (The two logic sets are not shown in FIG. 15.) The structure of each logic set is provided based on the algorithm for deciding when a request exists in the J stage and when a request exists in the E stage to which the request of the J stage is going to be transferred, and if the request in the E stage will not be transferred to the S stage in the next cycle, the request is kept waiting at the J stage. The logical structure is the same as that of FIG. 14, so that the description of the structure will be omitted. In this case, FFs 7180 and 7181 are used to delay the signal by one cycle in order to align the time relation.

In the present embodiment, the processing algorithm of the priority generating logic 74 does not relate to the effect of the present invention. For example, the priority can be generated by using a pseudo random sequence that is generated by a free run counter. This priority generating algorithm should be suitably selected in accordance with the characteristics and object of the system.

By executing the above control, the order relation can be maintained while the request processing is executed. When processing is to be executed in synchronism with the J stage (for example, coherence control of the BS), it is controlled so that an out-of-order condition will not occur in the order of the request processing at the J stage, so that the execution order of processing is guaranteed. Thus, there occurs no inconsistency in the processing order. The processing order of the requests at the E stage will not necessarily be guaranteed when the processing order is checked among different WS data arrays. However, disturbance of the order control can not be observed for the following reasons.

(1) Data consisting of the WS can be maintained for the following reason. When the E stages of the WS data arrays are individually locked, the requests are processed in the order that they have been selected at the P stage. Therefore, when data corresponding to a certain address is to be referred to or updated, their order is always the same as the request selecting order at the P stage, so that no inconsistency occurs in the order.

(2) The data reading order viewed from the processing unit side is guaranteed within each of the WS data arrays 50 to 53 for the same reason as that in (1), but the processing order can not be guaranteed among the data arrays. However, it is possible to absorb time deviations among the WS data arrays by managing responses from each of the four WS data arrays for every block transfer at the BS side and by controlling the processing order of the block transfer. Further, the processing order that can be observed by the other processing unit, as has been explained in the discussion of the prior art technique, always coincides with the processing order that each request has passed the J stage, because the buffer coherence control is executed in synchronism with the J stage. Accordingly, it can be prevented by the observation that erroneous data is read out.

In the present control, when a request is kept waiting at the J stage because of a conflict concerning the WS data arrays 50 to 53 and when a preceding request is kept waiting at the E stage, and if the WS data array is to be used by this request, no inconsistency occurs for the following reason. Inconsistency of processing order does not occur because the state of the preceding requests at the E stage has been predicted by the above-described selecting algorithm at the P stage and it has been controlled so that the request is not selected at the WS data arrays 50 to 53. Accordingly, the request is kept waiting at the J stage only when the BS coherence control logic 8 is busy.

When the WS 4 employs a store through system in the present embodiment, there is no substantial change in the above-described structure of the embodiment, except that the store request is also sent to the main storage unit. In this case, the transmission of the store request to the main storage unit can be executed in synchronism with either the J stage or the E stage.

In the present embodiment, the condition that each of the other sub-units within the WS is busy is simplified. The following factors can also be added as other busy conditions. Busy factors within the WS data arrays 50 to 53 can be added to wait factors at the E stage and other factors can be added to wait factors at the P stage or can be added to conditions that a request is not selected.

As a modification of the present embodiment, it is possible to control replacing of the processing order of the read request and the write request when addresses are not consistent within the E stage. In this case, it is possible to guarantee the order, which has been explained in the discussion of the prior art technique, by guaranteeing only the consistency of data in the WS. By using this modified system, it is possible to implement the present invention using a BS of the store-in type.

By implementing the present invention, it is possible to provide a buffer storage unit which keeps the processing order in the buffer storage equipment, as has been explained in the discussion of the prior art technique, improves the utilization efficiency of the buffer storage equipment and which provides a quick response of target data to a block transfer.

We claim:

1. In a buffer storage for storing a copy of data which is stored in a main storage unit, the buffer storage comprising a plurality of memory sections, which are capable of simultaneous operation, a buffer storage control method for processing requests received from a plurality of processing units for reference to or update of data stored in the buffer storage, comprising the steps of:
   determining, when a received request is for access to data stored in at least two of said plurality of memory sections, whether each of said at least two memory sections is accessible or not; and
   deciding access timings individually for each of said at least two memory sections for making access to the respective memory sections in accordance with the result of said determining so that access may be made to memory sections in accordance with the received request at timings based on the accessibility of the individual memory sections.

2. In a system having a shared buffer storage connected to a plurality of instruction processors, each instruction processor having a buffer storage unit, and to a main storage unit, said shared buffer storage operating in a plurality of pipeline stages to access data in response to requests received from said instruction processors, comprising:
   a plurality of independently operable memory units for holding data;
   a plurality of request holding means each for holding an access request from a respective one of said instruction processors for accessing one or more memory units;
   means for selecting a request to be processed from among access requests held in said plurality of request holding means;
   means for detecting whether data corresponding to a selected request exists in said plurality of memory units; and
   a buffer storage control system which controls said selection means to select requests from said request holding means such that an order of requests as received from each instruction processor is observed and for processing said selected requests in pipeline states, which include a stage for not carrying out out-of-order processing of requests and a stage for carrying out out-of-order processing of requests, wherein a request is kept in a waiting state at the stage where the out-of-order processing is carried out.

3. A computer system having a plurality of processing units, comprising:
   a main memory;
   a buffer storage, including a plurality of storage areas, connected to said plurality of processing units and to said main memory, for storing a part of data stored in said main memory;
   a plurality of access request storage means each for storing access requests, for making access to said main memory, which are received from a respective one of said plurality of processing units;
   means for reading access requests from said access request storage means; and
   means for controlling execution of access requests in a processing order with a priority in which a process request to access at least two storage areas of said plurality of storage areas in said buffer storage is processed with a higher priority than a request to access a single or lesser number of said plurality of storage areas.

4. A computer system having a plurality of processing units, comprising:
   a main memory;

a buffer storage, including a plurality of storage areas, connected to said plurality of processing units and to said main memory, for storing a part of data stored in said main memory;

a plurality of access request storage means each for storing access requests for making access to said main memory, which are received from a respective one of said plurality of processing units;

request processing means, including a plurality of processing means each corresponding to a respective one of said storage areas, for processing sequential accesses to said storage areas in pipeline execution stages;

request selection means for accepting an access request from an access request storage means in a first-in-first-out order in which access requests are received by the access request storage means from a processing unit, dividing an accepted access request into a plurality of sequential accesses each of which is processed individually by said processing means and sending said sequential accesses to respective processing means based on a wait state of access requests in said respective processing means and an execution state of said processing means in a next execution stage thereof.

5. A computer system comprising:

a plurality of processing units;

a main storage unit; and a buffer storage unit connected between said plurality of processing units and said main storage unit for storing part of data stored in said main storage unit, said buffer storage unit including:

a plurality of storage sections each of which can independently operate;

a plurality of request storage mean each for storing access requests received from a respective one of said plurality of processing units and each being exclusively used by a different processing unit;

first control means for selecting an access request from a request storage means; and a plurality of second control means each for accessing a respective one of said storage sections in accordance with an access request;

wherein said first control means includes means for transferring a selected access request to said second control means in correspondence with a storage section having data accessed by said selected access request, so as to maintain a processing order for executing access requests in the order received from a processing unit and to maintain said order for executing access requests to the same storage section.

6. A computer system according to claim 5, wherein said first control means comprises means for selecting an access request in accordance with a status of data access in said plurality of second control means.

7. A computer system according to claim 6, wherein said selecting means selects with priority an access request, from access requests stored in said plural access request storage means, which accesses data stored in at least two storage sections.

8. A computer system according to claim 6, wherein said second control means comprises means for dividing a selected access request into plural sub-requests, each corresponding to a respective storage section, if said selected access request accesses data stored in at least two storage sections of said plural storage sections.

9. A computer system according to claim 8, wherein said first control means determines a transfer timing for each storage section for transferring said sub-requests divided by said dividing means to said second control means.

10. A computer system according to claim 9, wherein said first control means comprises means for searching a storage section in which accessed data exists in accordance with an address included in a selected access request.

11. A computer system according to claim 9, wherein said second control means accesses a corresponding storage section regardless of an access-status of another storage section.

12. A computer system according to claim 11, wherein said second control means holds succeeding access requests in a wait state in accordance with a processing-status of preceding access requests to a particular storage section.

* * * * *